United States Patent [19]
deMey, II

[11] 4,322,166
[45] Mar. 30, 1982

[54] MONOCHROMATOR

[75] Inventor: Charles F. deMey, II, West Redding, Conn.

[73] Assignee: The Perkin-Elmer Corporation, Norwalk, Conn.

[21] Appl. No.: 11,259

[22] Filed: Feb. 12, 1979

[51] Int. Cl.³ .............................................. G01J 3/18
[52] U.S. Cl. .............................. 356/334; 350/162 R; 350/315
[58] Field of Search ...................... 356/332, 333, 334; 350/162 R, 315

[56] References Cited

U.S. PATENT DOCUMENTS

| Re. 26,053 | 7/1966 | Cary | 356/334 X |
| 3,433,557 | 3/1969 | McPherson | 356/334 X |
| 3,594,084 | 7/1971 | Turner | 356/334 |

*Primary Examiner*—F. L. Evans
*Attorney, Agent, or Firm*—S. A. Giarratana; F. L. Masselle; R. A. Hays

[57] ABSTRACT

There is disclosed a filter-grating monochromator for use in an optical analytical instrument. The monochromator is characterized by a simplified construction compared to prior art monochromators. Nevertheless, the monochromator includes features which retain the desired high accuracy, including a novel sine bar grating drive mechanism and filter change mechanism.

12 Claims, 17 Drawing Figures

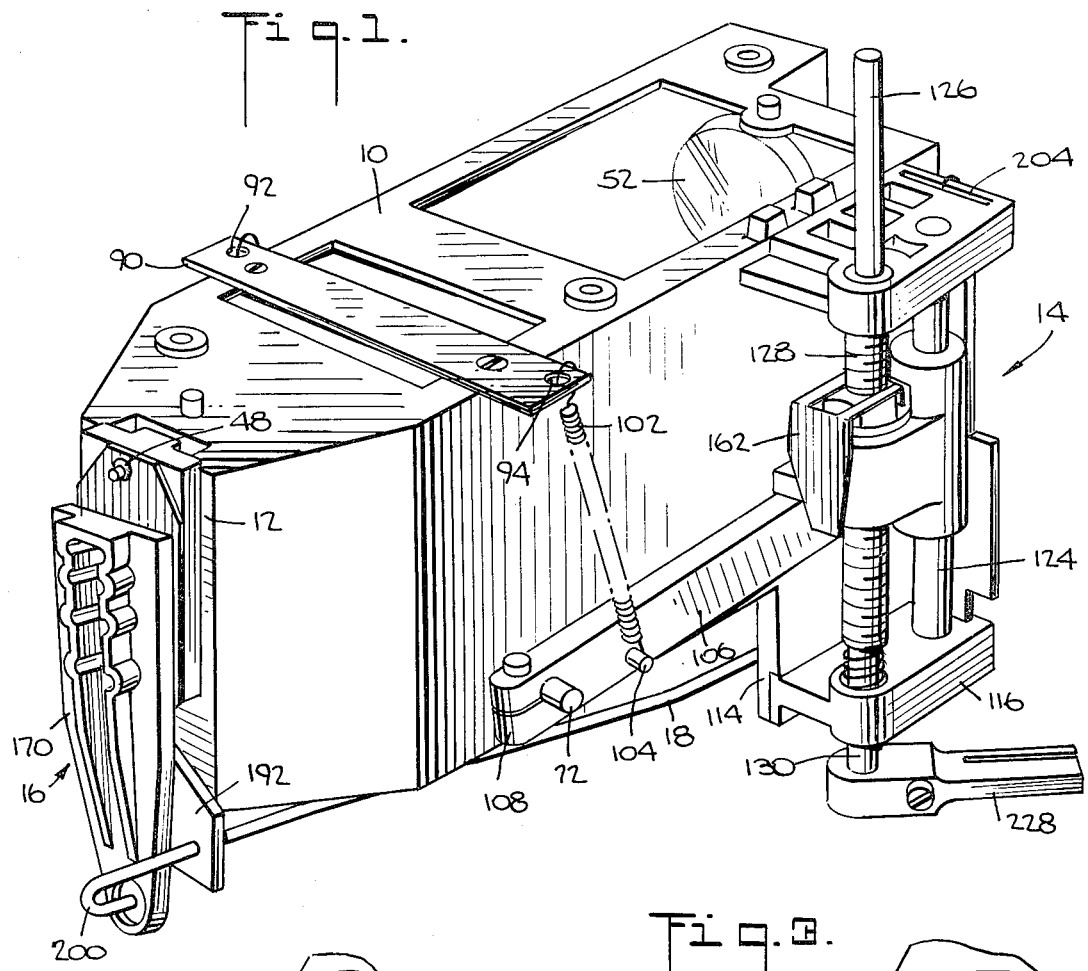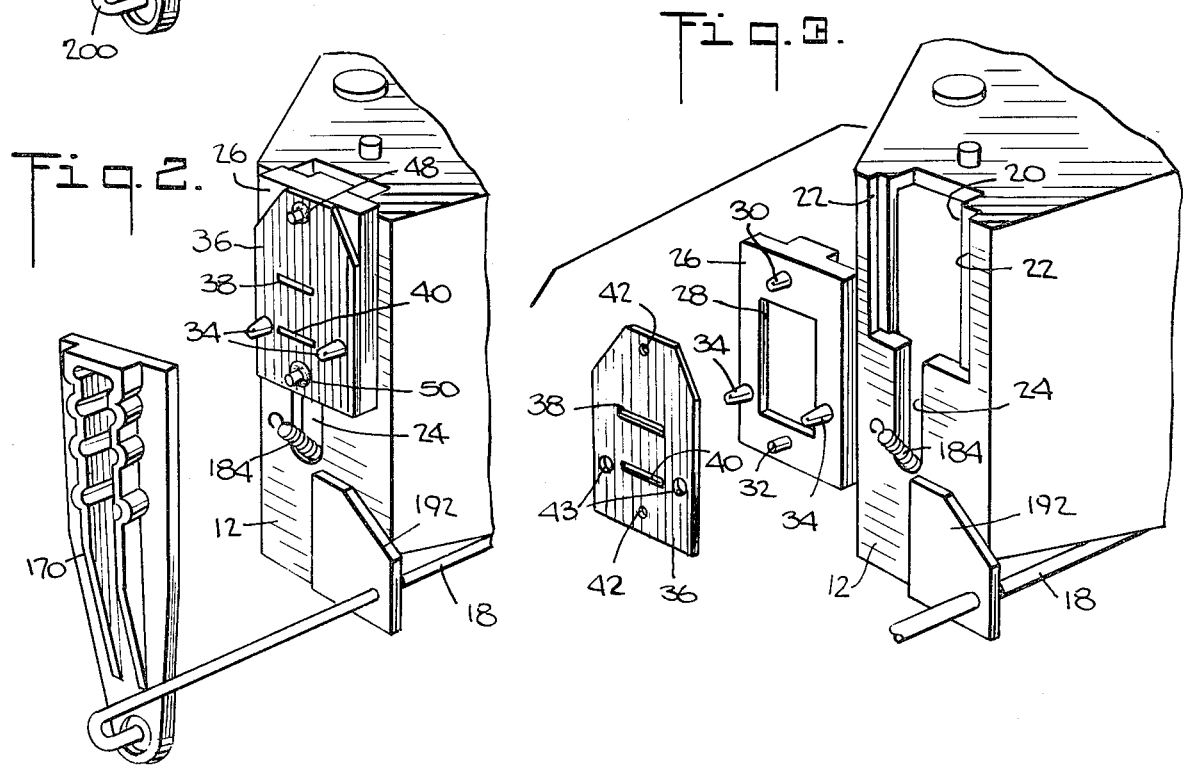

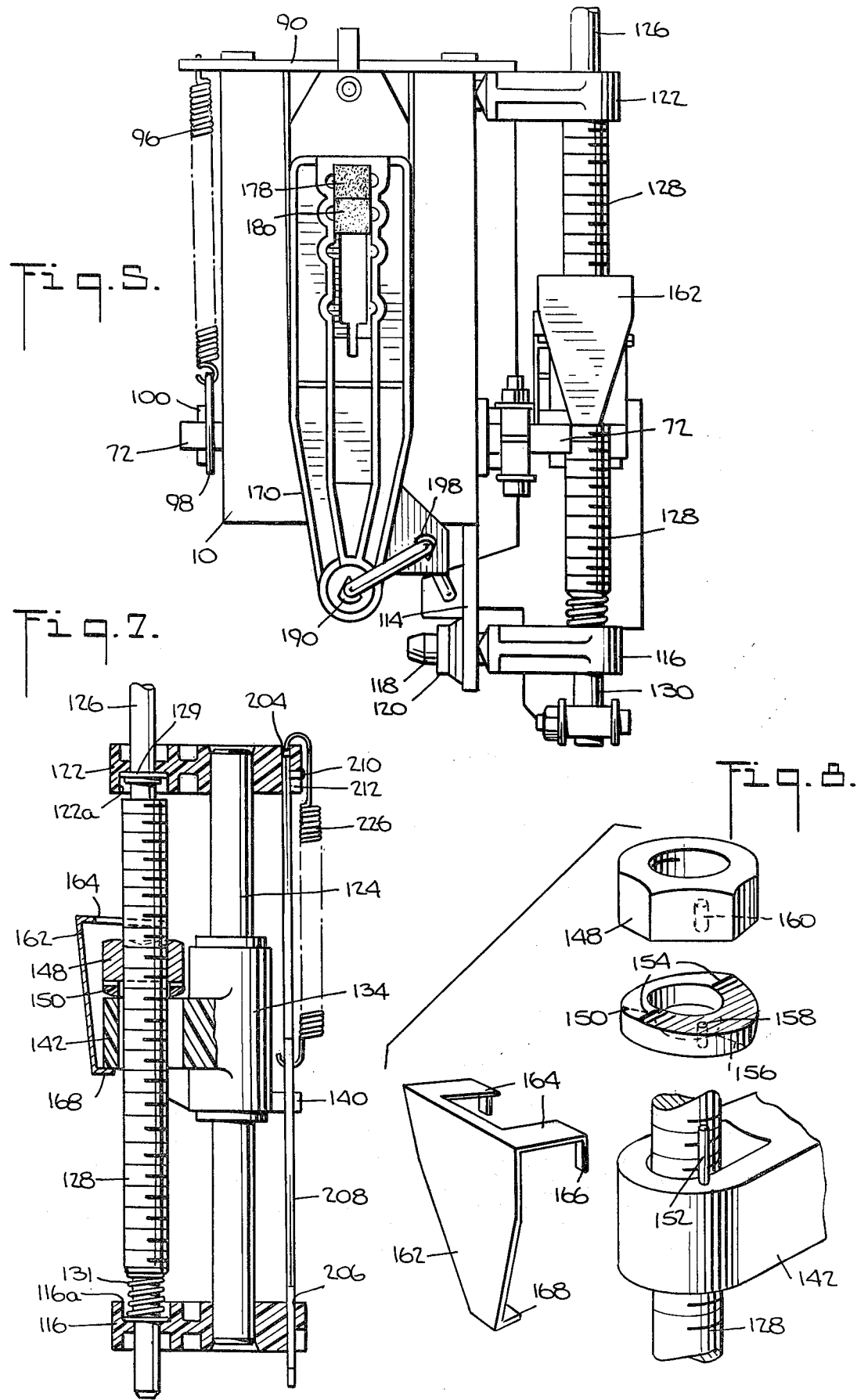

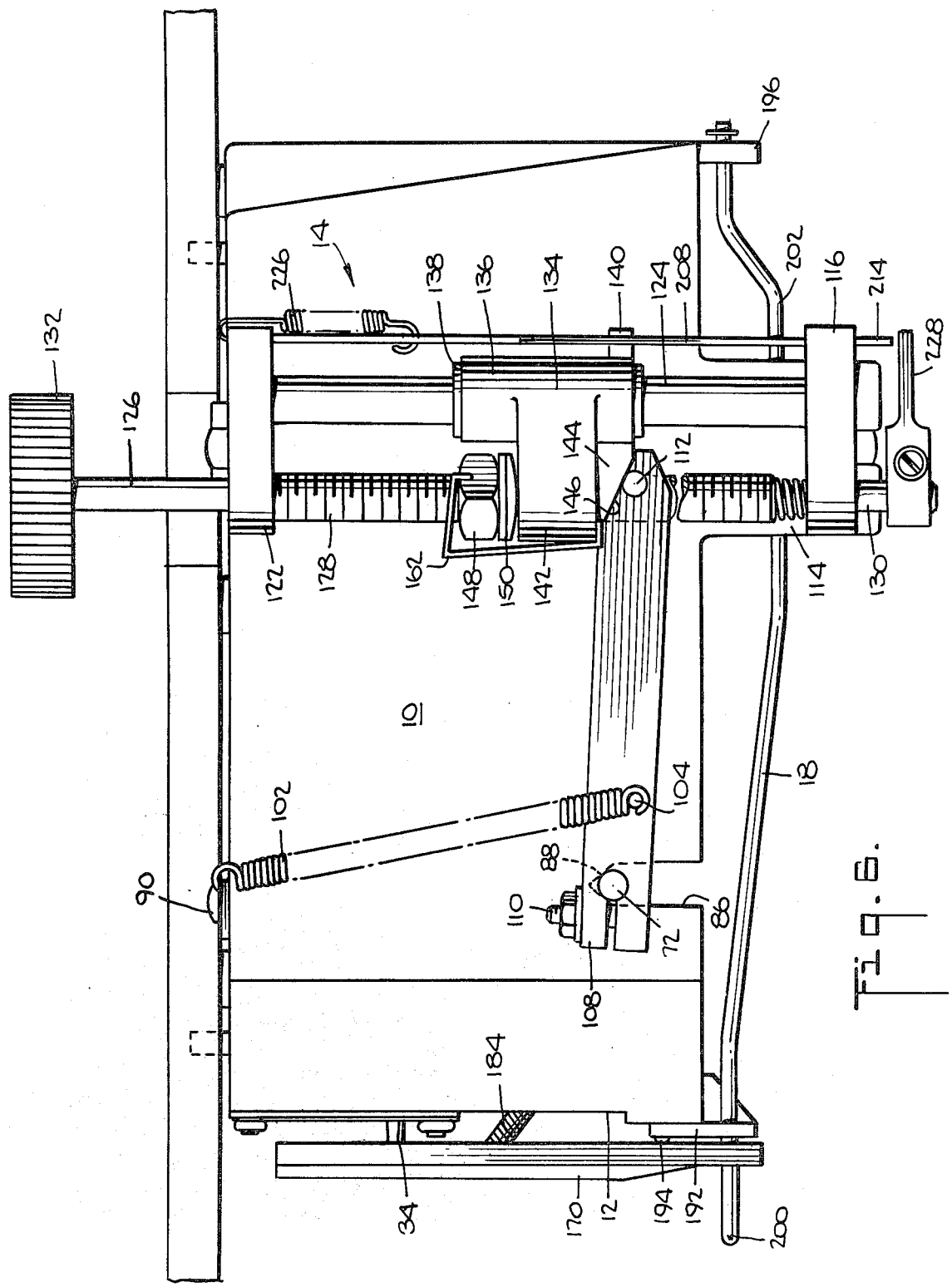

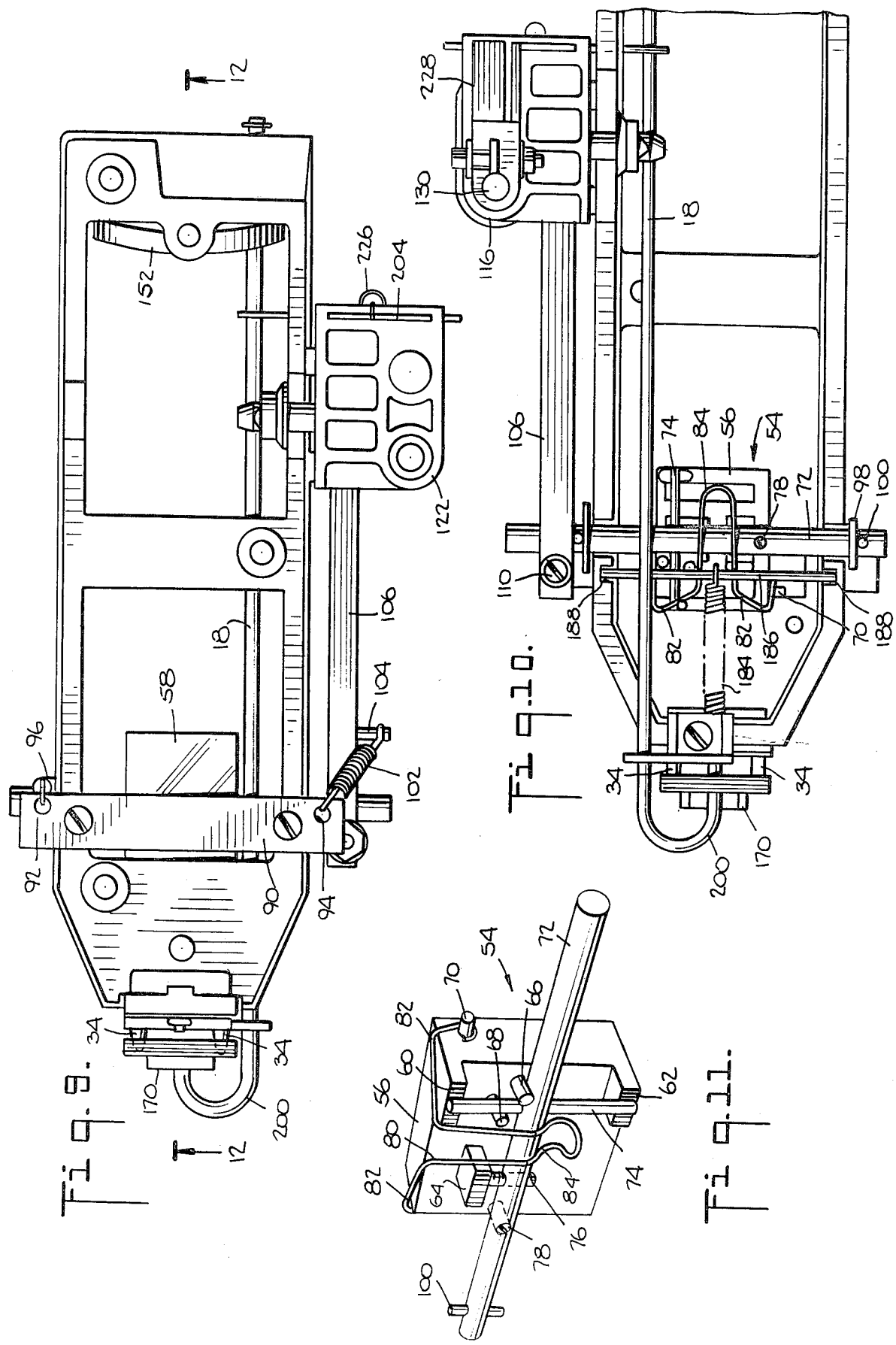

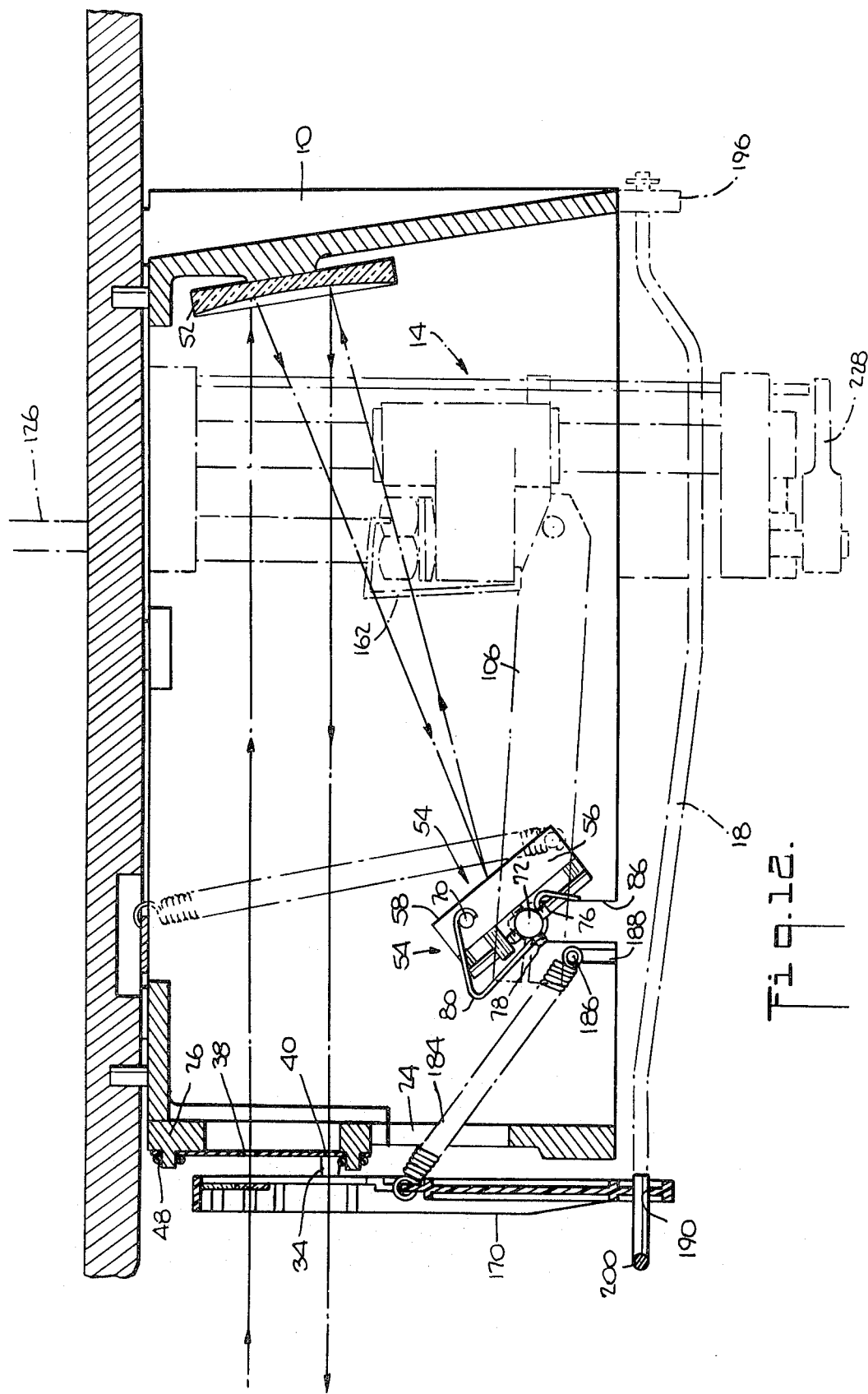

MONOCHROMATOR

BACKGROUND OF THE INVENTION

Monochromators are well known to the prior art. Their function is to isolate selected wavelengths from a source of illumination. This may be done in the form of a scan through the spectrum of interest. In absorption photometers, the amount of absorption by a sample at different wavelengths may serve to identify the sample and its concentration. In applications such as detectors for liquid chromatographs, scanning may be replaced by observation of absorption at one or more specific wavelengths. In either application it is important to be able to accurately select the wavelengths to be observed.

A monochromator normally includes a housing having a radiation entrance slit and a radiation exit slit. Radiation from a suitable source, such as a lamp, is focused on the entrance slit. A collimating mirror is mounted within the housing with its focal point between the entrance and exit slits. It collimates the received radiation and the collimated radiation is caused to fall upon a dispersing element such as an optical grating. The grating disperses the radiation in accordance with its wavelength and a very narrow wavelength range is refocused by the collimator onto the exit slit of the monochromator.

The grating is mounted so that it may be precisely rotated and the degree of rotation is correlated with the output wavelength of the monochromator. In some prior art applications, this is obtained by means of a sine bar mechanism. In such a construction, a lead screw is caused to advance or retract a bar which serves as a camming surface. A pivoted drive arm is secured at its pivoted end to the grating and has at its other end a cam follower which bears against the camming surface. As will be explained more fully below, the amount of movement of the camming surface, and thus the number of turns made by the lead screw, is proportional to the sine of the angle through which the grating rotates. A disadvantage of such a construction as known to the prior art is that the camming surface is relatively long and, when the follower approaches either extreme end of the camming surface, it creates undesirable torque effects which must be overcome.

Filters are commonly used in conjunction with grating monochromators. This is because gratings, unlike prisms, produce higher orders of diffracted radiation which must be suppressed. This is accomplished by inserting filters into the radiation path, usually at the entrance or the exit slit. However, as the grating rotates, different filters are required for different wavelength ranges. For optimum results filters must be changed rapidly and accurately with change of wavelength.

Another problem associated with grating monochromators is that the grating drive must be very accurate. However, it is not a simple matter to obtain lead screws which are accurate to the required degree. Slight variations in screw straightness or roundness and other variations arising during the threading process will often introduce undesirable errors requiring compensation.

Accordingly, it is a primary object of the present invention to provide a simplified and relatively inexpensive filter-grating monochromator which retains the accuracy of more expensive devices. Other objects are to provide such a monochromator having an improved grating mounting, having an improved grating drive mechanism, having a lead screw mechanism which damps out undesirable variations in travel, and having an improved filter change mechanism. Other objects, features and advantages will become apparent from the following description and appended claims.

SUMMARY OF THE INVENTION

An improved monochromator of the type having a housing which defines radiation entrance and radiation exit slits. Means are provided within the housing for collimating radiation from the entrance slit as are an optical grating for dispersing the collimated radiation by wavelength, and means for emitting a selected portion of the dispersed radiation from the exit slit. In one aspect of the invention, the improvement comprises at least one radiation filter and means for selectively positioning the filter in the radiation path. In addition, there is provided a rotatable mount for supporting the optical grating and means for rotating the mount. The rotating means comprises a camming arm secured to the mount for rotation therewith about an axis and a cam follower which is positioned at a predetermined arm length from the axis of rotation of the mount for travel along an arc during such rotation. The arm length corresponds to the hypotenuse of a right triangle which includes the angle of rotation of the mount. A movable camming surface is positioned to advance and retract the cam follower by a distance which is proportional to the sine of the angle. Means are provided for so advancing and retracting the camming surface while simultaneously translating it along substantially the entire arc traversed by the cam follower.

BRIEF DESCRIPTION OF THE DRAWINGS

FIG. 1 is a perspective view of a monochromator in accordance with the present invention;

FIG. 2 is a partial view of the monochromator of FIG. 1 showing the entrance and exit slits with the filter mechanism exploded therefrom;

FIG. 3 is a view similar to FIG. 2 with the slit portions exploded therefrom;

FIG. 5 is a front end view of the monochromator of FIG. 1;

FIG. 6 is a right side view of the monochromator of FIG. 5;

FIG. 7 is a partial cross-section of the lead screw portion of the grating drive mechanism;

FIG. 8 is an exploded view of a portion of the lead screw mechanism;

FIG. 9 is a top view of the monochromator of the invention;

FIG. 10 is a bottom view of a portion of the monochromator of the invention;

FIG. 11 is a perspective view illustrating the grating mount;

FIG. 12 is a cross-section taken substantially along the line 12—12 of FIG. 9, illustrating the optical path through the monochromator;

FIG. 16 is a diagram illustrating the manner of operation of a prior art sine bar grating drive; and, FIG. 17 is a diagram similar to FIG. 16 illustrating the principle of operation of the improved sine bar grating drive of the present invention.

DESCRIPTION OF THE PREFERRED EMBODIMENT

Figure 4:
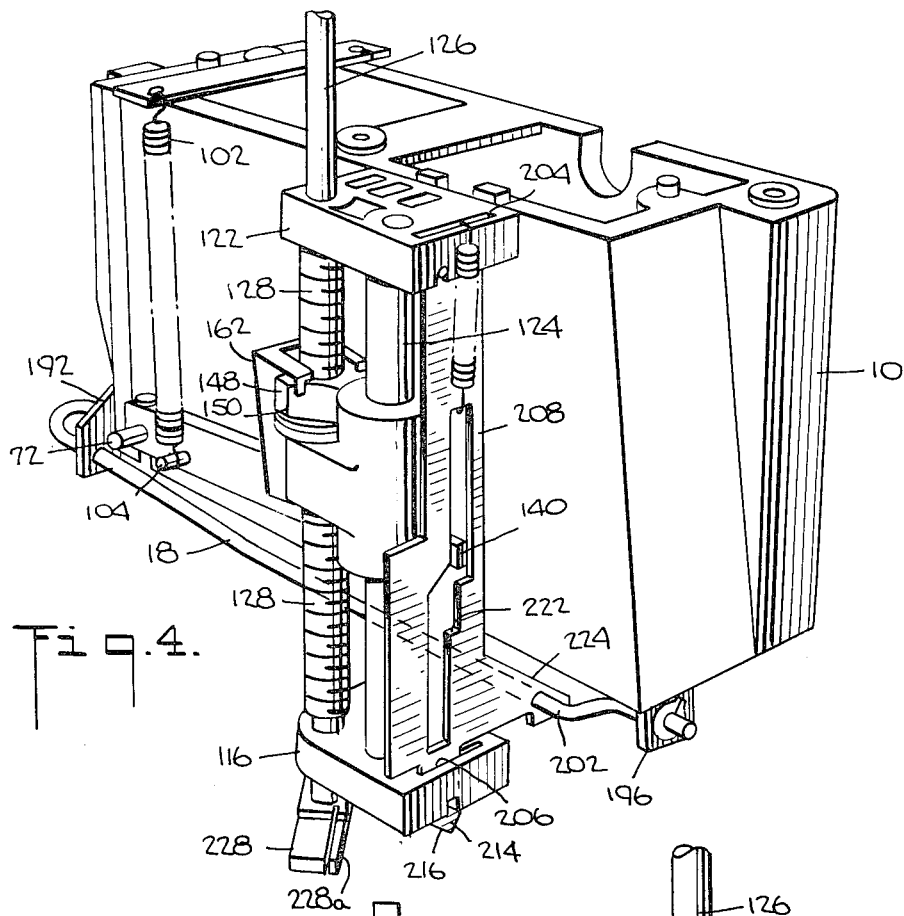
FIG. 4 is a perspective view of the monochromator illustrating the filter change mechanism.

With particular reference to FIG. 1, there is illustrated a monochromator constructed in accordance with this invention. It comprises a housing 10 of cast box-like construction somewhat narrowed toward its left end as viewed in FIG. 1 to form a narrowed front wall 12. A filter grating drive mechanism 14 is mounted on the side of the housing. A filter assembly 16 is reciprocally mounted on the front of the housing and is operable from the filter grating drive mechanism 14 by means of a crankshaft 18 as will be explained.

As illustrated in FIG. 3, the narrowed front wall 12 of the housing defines a rectangular opening 20 therethrough having vertical recesses 22 on either side. A vertical slot 24 through the front wall 12 extends downwardly from the opening 20. Mounted across the opening 20 within the recesses 22 is a rectangular slit positioning block 26 which has a relatively large rectangular aperture 28. A pair of positioning pins 30, 32 extend forwardly from the block 26, respectively above and below the opening 28. Another pair of slightly longer guide pins 34 extend forwardly on either side of the aperture 28.

Mounted against the slit positioning block 26 and over the aperture 28 is a relatively thin metal slit plate 36, which defines an upper radiation entrance slit 38 and a lower radiation exit slit 40. The plate 36 is positioned by means of holes 42 aligned with the pins 30 and 32. Two larger holes 43 are provided in the sides of plate 36 for receiving guide pins 34. The slit plate 36 is held in position against block 26 by means of a pair of O-rings 48, 50 mounted on positioning pins 30, 32 as shown in FIG. 2. Mounted within the housing 10, and against its back wall as illustrated in FIG. 12, is a collimating mirror 52. The mirror 52 is positioned such that its focal point lies between entrance slit 38 and exit slit 40.

GRATING ASSEMBLY

Mounted within the housing 10 is a grating assembly 54. The assembly is shown in detail in FIG. 11. It comprises a die cast grating block 56 which is substantially rectangular and carries on its front (back as viewed in FIG. 11) surface a replicated reflective grating surface 58 (FIG. 12). Projecting outwardly from its back surface are upper 60 and lower 62 shoulders. These shoulders are at the right end of the rectangular block 56 as viewed in FIG. 11. An adjusting tab 64 also extends rearwardly from the back surface of block 56, but toward the left end. Intermediate the shoulders 60, 62 are a pair of rearwardly projecting spaced pins 66, 68, the pin 66 being slightly lower than pin 68. Projecting outwardly from the side edges of the block 56 are a pair of aligned spring support pins 70.

The grating block 56 is mounted against a grating shaft 72 which carries a cross rod 74 extending therethrough. The shaft 72 also carries a vertical set screw 76 which bears against adjusting tab 64 and a horizontal set screw 78 which bears against the back of the grating block 56 at its left end. The grating block 56 is held in place with shoulders 60, 62 bearing against the cross rod 74 by means of a generally U-shaped spring clip 80. Clip 80 has outwardly extending legs 82 bent to hook around the spring support pins 70 and a central portion 84 clampingly engaging the grating shaft 72, resulting in the grating shaft 72 being pressed inwardly against the block 56 and upwardly against pin 66 and adjusting tab 64.

The grating and grating shaft assembly of FIG. 11 is mounted within the housing 10 by seating the ends of the shaft 72 in a pair of aligned slots 86 extending upwardly from the bottom edges of the sidewalls of housing 10, as shown in FIG. 6. The upper ends of the slots 86 are V-shaped 88. The grating assembly 54 is maintained in snug engagement with the V-shaped portions 88 of the slots 86 by means of a pair of springs. A spring bracket 90 (FIG. 9) is mounted across the top of the housing 10 and its extended ends include openings 92, 94. One end of a spring 96 is hooked into the opening 92 and at its lower end is connected to the grating shaft 72 by means of a link 98 which may be of a low static friction material, such as acetal. Link 98 is retained by a pin 100 which extends through the shaft 72.

The opposite end of the grating shaft 72 is secured within its corresponding slot 86 by means of a spring 102, connected at its upper end in the opening 94 and at its lower end to a pin 104, which extends outwardly from a grating drive arm 106. One end 108 of drive arm 106 is bifurcated as shown in FIG. 6 so as to clampingly engage the end of the grating shaft 72 by means of a nut and bolt assembly 110. The opposite end of drive arm 106 carries a cam follower 112 which is held downward against the force of spring 102 by a grating drive mechanism which will be described in the following section.

GRATING DRIVE MECHANISM

In accordance with the present invention, the grating is rotated by a lead screw in such a relationship that the rotation of the screw is proportional to the sine of the angle of grating rotation. The means by which this is accomplished will be described with particular reference to FIGS. 16 and 17.

In FIG. 16, there is illustrated schematically a grating G to which is secured a drive arm of length h terminating at its end in a cam follower F. Controlling the cam follower is a vertically movable drive bar B. Considering now the triangle formed by the drive arm h, a base line b, and the height a of follower F, it will be noted that the sine of the angle $\alpha$ through which the grating G rotates equals $a/h$. Also, it will be apparent that as the drive bar B rises and descends, the follower F will follow along the illustrated arc so that, for example, when it reaches F', the sine of the angle of rotation is given by $a'/h$. Since h remains constant, it will be apparent that sine $\alpha$ is proportional to a. As explained above, this prior art construction has the disadvantage of requiring a relatively long drive bar B with consequent torque problems when the follower F is near the extreme ends.

Figure 17:
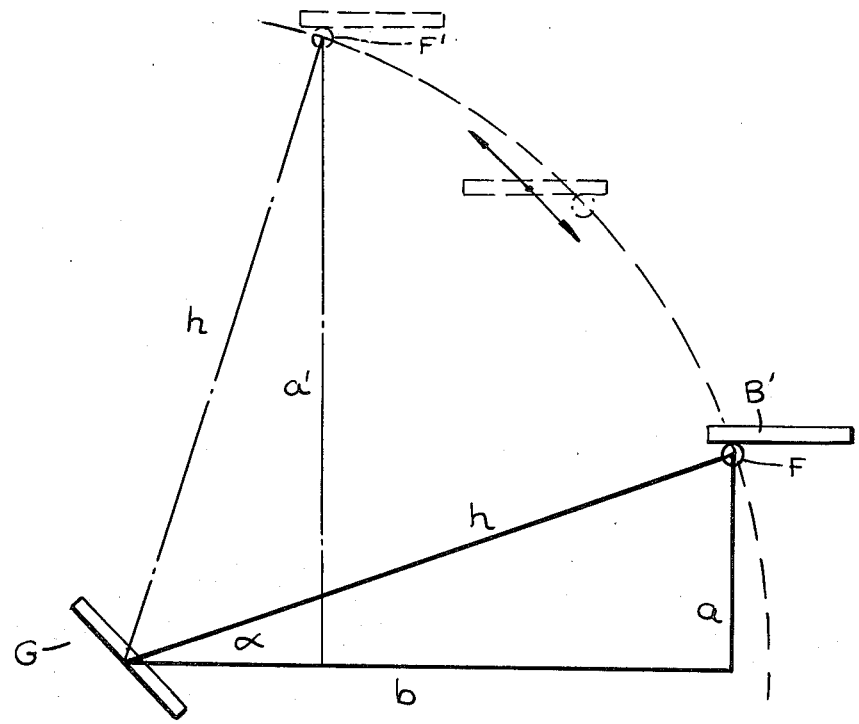

FIG. 17 illustrates the manner in which this problem is overcome by the invention. Succinctly stated, instead of moving a long bar vertically, a short bar B' is moved along a line representing a chord of the arc described by the follower F. If, as shown in FIG. 17, the bar B' is moved along the path indicated by the arrows, this results in a geometry similar to that of FIG. 16, but permits use of a much shorter drive bar. As the angle between the linear direction of motion of the drive bar B' and vertical remains constant, the distance of travel of the drive bar also remains proportional to the sine of the angle $\alpha$. However, it is important that the surface of the drive bar B' remain at such a fixed angle to its direction of movement. If now the reader will view FIG. 17 with the direction of motion of the bar B' placed in a vertical direction, the practical application of the schematic illustration to the invention embodiment described below will become clear.

One sidewall of the housing 10 includes a downward projection 114 (FIG. 15) to which is secured a lower bracket 116 by means of a threaded stud 118 and nut 120. An identical upper bracket 122 is similarly mounted at the top of housing 10 and is aligned with the lower bracket 116. In one embodiment, these brackets are formed of acetal. Supported vertically between the brackets 116, 122 is a steel guide rod 124. Mounted between the brackets parallel to the guide rod 124 is a screw shaft 126 which has a lead screw 128 on its central portion intermediate the upper and lower brackets. Upward travel of the lead screw is limited by a washer 129 (FIG. 7) which bears against the base of a recess 122a in bracket 122. The lower end 130 of the shaft 126 extends below the lower bracket 116. A spring 131 between a similar recess 116a in bracket 116 and lead screw 128 tends to keep the screw shaft 126 in a raised position. The upper end of the screw shaft 126 extends through and beyond the upper bracket and carries a wavelength selection knob 132 (FIG. 6).

Slidably mounted on guide rod 124 is an acetal slide member 134 having a cylindrical portion 136 encircling guide rod 124 and slidable therealong by means of a metal sleeve bearing 138. The lower end of slide member 134 carries an actuator tab 140 which projects to the right as viewed in FIG. 6. The function of this tab will be described below. Projecting from slide member 134 to the left, as viewed in FIG. 6, is a U-shaped boss 142 which surrounds, and is spaced from, the lead screw 128 as illustrated in FIG. 8. A shoulder 144 projects downwardly from boss 142 and behind the lead screw 128 as viewed in FIG. 6. The shoulder 144 has an inclined linear camming surface 146 which bears downwardly against the follower 112 of grating drive arm 106 and against the force of spring 102.

The manner in which rotation of lead screw 128 is transmitted to slide member 134 is best illustrated in FIGS. 7 and 8. The primary elements are a drive nut 148 on lead screw 128, a nylon gimbal washer 150, and a small steel pin 152 which extends upwardly from the boss 142 parallel with the lead screw 128. Gimbal washer 150 resembles a conventional washer in many ways but differs importantly therefrom in that its upper surface is in the form of a pair of inclined planes intercepting along a diameter to form a raised ridge 154. Its lower surface is similarly formed to create a diametrical ridge 156, 90° to the ridge 154. The washer 150 also includes a hole 158 for loosely receiving pin 152 therethrough. A hole 160 also extends upwardly from the lower surface of drive nut 148 to receive the end of the pin 152 to prevent rotation of the nut. Any tendency of the boss, washer, and nut assembly to separate is prevented by means of a spring clip 162 which includes a pair of spaced, L-shaped spring arms 164 arranged to overlie the nut 148, each being provided with a depending finger 166 for engaging facets of the nut. The lower end of spring clip 162 is narrowed drastically and bent to provide a short tab 168 to engage the bottom of boss 142.

FILTER CHANGE MECHANISM

The filter assembly 16, which is positioned adjacent the front wall 12 of housing 10, comprises a vertically elongated molded nylon filter carrier 170. Formed on the back surface of the filter carrier 170 are a pair of vertical, parallel grooves 172 (FIG. 15), each of which receives one of the guide pins 34 protruding from the slit positioning block 26. The carrier 170 defines an elongated vertical window 174 which is bounded by a pair of raised ribs 176. Secured between the ribs and over the window 174 are a pair of filters 178, 180. It will be obvious that additional filters may be added as required. At the bottom of window 174 there is provided a slot 182 which receives one end of a coil spring 184 within housing 10 (FIG. 12). The opposite end of spring 184 is connected to a crossbar 186 mounted with its ends in aligned slots 188 in the opposed sidewalls of housing 10. At the bottom of the filter carrier 170 there is formed a hole 190.

Figure 15:
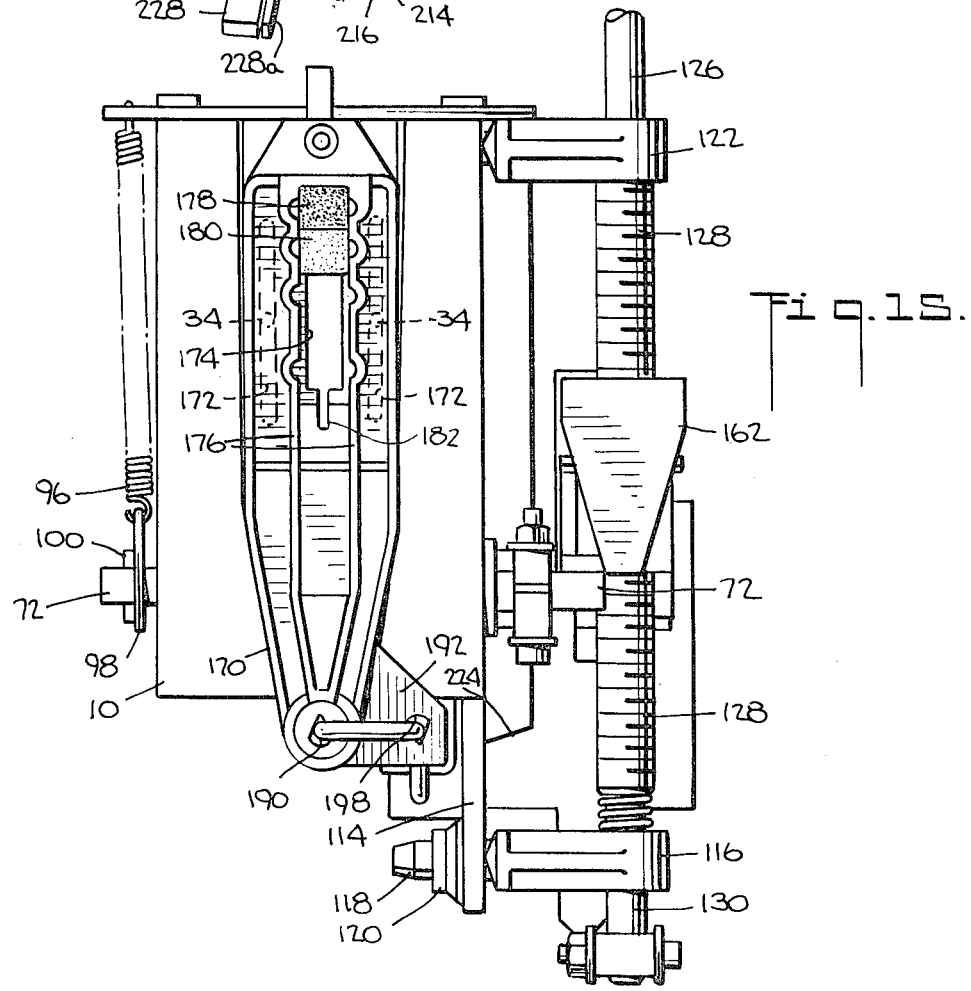
FIG. 15 is a front end view similar to FIG. 5 but showing the filter selector in a raised position.

Mounted at the bottom of front wall 12 of housing 10 is a nylon bracket 192 which carries on its front surface a small rounded projection 194 (FIG. 6). The spring 184 retains the filter carrier 170 in position bearing against this projection and also bearing against the guide pins 34. The crankshaft 18 extends the length of the housing 10 and is supported at its rear end by a tab 196 projecting downwardly from the back of housing 10. Near its forward end, the crankshaft 18 is rotatably supported by an opening 198 in the bracket 192 (FIG. 15). The portion of crankshaft 18 forward of the bracket 192 is bent into a U 200 with the end of the crankshaft 18 entering the hole 190 in the filter carrier 170. Adjacent the filter grating drive 14, the crankshaft 18 is bent to form an offset crank portion 202 (FIG. 6).

Turning now to FIG. 4, it will be observed that upper bracket 122 and lower bracket 116 include respective aligned slots 204, 206 which loosely receive the respective upper and lower ends of a cam plate 208. The upper end of cam plate 208 is relatively wide and carries a pin 210 (FIG. 7) which extends into a recess 212 communicating with the slot 204. The lower end of cam plate 208 comprises a tongue 214 (FIGS. 13 and 14) which is substantially narrower than slot 206 and terminates below the lower bracket 116 at a tapered edge 216. The cam plate 208 defines a vertical slot 218 through which extends the actuator tab 140 on slide member 134. The slot 218 is stepped as illustrated, thereby forming a pair of camming shoulders 220, 222. Cam plate 208 also includes a sidewardly projecting arm 224 which is drilled to receive the crank portion 202 of the crankshaft 18 therethrough. A coil spring 226 is connected between the upper bracket 122 and the top of slot 218 in the cam plate. Secured to the bottom end of screw shaft 126 for rotation therewith is a nylon flipper 228. Flipper 228 includes an off-center slot forming a relatively thin, resilient finger 228a. The length of flipper 228 is sufficient to span the distance from the lower end 130 of the screw shaft to the tongue 214 on cam plate 208.

OPERATION

FIG. 12 illustrates the optical path through the monochromator of this invention. Radiation from an external source is imaged at entrance slit 38. Light from the entrance slit impinges on the collimating mirror 52. The collimated radiation leaving the mirror impinges upon the grating surface 58 wherein it is diffracted and reflected in a conventional manner. The diffracted radiation is reimaged by mirror 52, a selected portion thereof exiting the monochromator at exit slit 40.

Grating Drive

The wavelength of the radiation exiting the monochromator is controlled by wavelength selector knob 132. As this knob is rotated, the drive nut 148, which is restrained from rotation by pin 152, rises or falls on lead screw 128 carrying with it slide member 134 which is urged vertically upward against nut 148 by the follower 112 on spring loaded drive arm 106. As previously described with reference to FIG. 8, the gimbal washer 150 is positioned between the boss 142 and the drive nut 148 and is also prevented from rotating due to the presence of the pin 152. Due to the presence of the ridges 154, 156, this washer acts in much the same manner as a gimbal mechanism to average out wobble and other non-linearities in the travel of nut 148 occasioned by any inaccuracies in the lead screw 128. Lack of straightness (curve) in the screw is accommodated by pivoting about pin 152 in one direction and by slide member 134 pivoting about guide rod 124 in the other direction. By use of this novel construction, an inexpensive lead screw is caused to deliver the accuracy normally requiring a much more expensive and precise lead screw. The function of the clip 162 is to avoid any tendency of the drive elements to separate.

It is believed that the operation of the sine bar drive mechanism for the grating will be apparent from the previous description in connection with FIGS. 16 and 17. As described therein, the slanted camming surface 146 is much shorter than the horizontal camming surfaces employed in the prior art. However, the same result is obtained in that the linear travel of the surface, and thus the rotation of the knob 132, is proportional to the sine of the angle through which the grating is rotated.

Grating Mount

The grating mount previously described in connection with FIG. 11 permits accurate initial adjustment of the grating. Adjustment of the vertical set screw 76 against the adjusting tab 64 causes the grating to tilt about pin 66. Adjustment of the horizontal set screw 78 rotates the grating about the cross rod 74. The action of springs 102 and 96 pulls the grating shaft 72 upwardly into the V-shaped portion 88 of the slots 86, providing accurate two point seating and avoiding the need for bearings.

Filter Selection

The filter change mechanism of this invention is designed to automatically change filters at preselected grating positions. The manner in which this is accomplished may be most readily understood by referring to FIGS. 4, 5, 13, 14, and 15.

Figure 13:
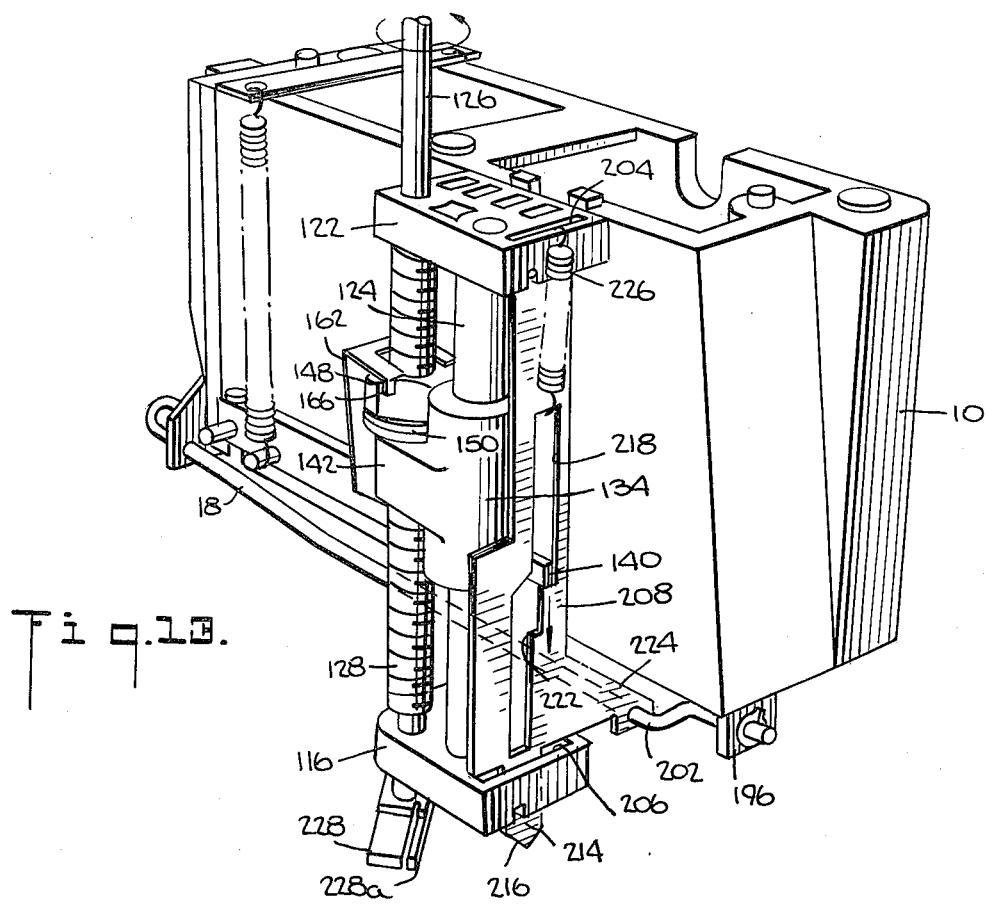
FIG. 13 is a perspective view of the monochromator of the invention, showing one stage of operation of the filter change mechanism.

Referring first to FIG. 5, the filter carrier 170 is shown in its lowermost position such that the upper filter 178 is positioned over the entrance slit. In this position, the U-shaped end 200 of crankshaft 18 is lowered as illustrated. At the same time, the actuator tab 140 of the slide member 134 is raised to the position illustrated in FIG. 4 such that it extends through the upper portion of the slot 218 in cam plate 208 and above the upper camming shoulder 200. As screw shaft 126 is turned to lower slide member 134, tab 140 also descends until it contacts the uppermost camming shoulder 220, as illustrated in FIG. 13. Continued rotation of the screw causes tab 140 to depress cam plate 208 against the force of spring 226, advancing the tapered edge 216 of tongue 214 into the path of flipper 228.

Figure 14:
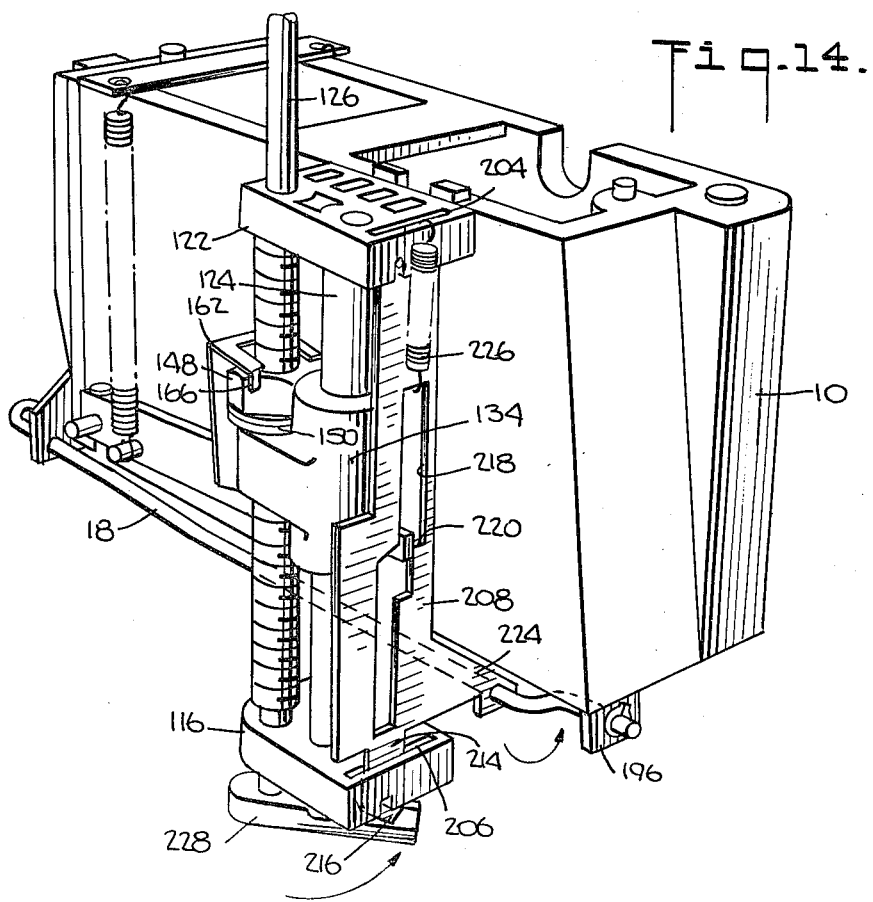
FIG. 14 is a view similar to FIG. 13 illustrating a further stage of operation of the filter mechanism.
Figure 18:
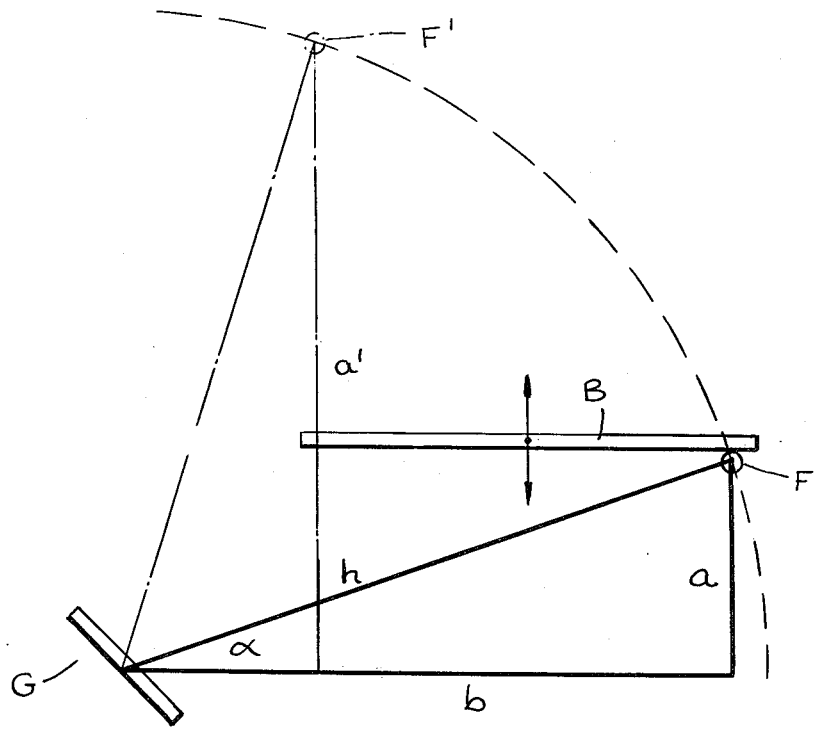

When resilient finger 228a of flipper 228 contacts the tongue 214, it pushes it to the right, as viewed in FIG. 14. The arm 224 of cam plate 208, acting upon the crank portion 202 of the crankshaft 18, causes it to rotate counterclockwise, as viewed in FIG. 14, or clockwise as viewed in FIGS. 5 and 15. The crankshaft 18 thus moves into the position shown in FIG. 15 lifting the filter carrier 170 so as to position the lower filter 180 over the entrance slit. In a similar fashion, the lower shoulder 222 of cam plate 208 may be employed to position still a third filter over the entrance slit. In the reverse direction of lead screw rotation, shoulders 220, 222 drop off actuator tab 140.

Slit Positioning Block

It has been explained that the slit positioning block 26 is separated from the housing 10 of the monochromator and is positioned within the opening 20 in the front wall 12. The reason for this is that the positioning of the slit plate, at the focal point of the collimating mirror 52, is quite critical. By means of the disclosed arrangement, the slit positioning block 26 may be accurately positioned, utilizing an adhesive such as an epoxy, after the collimating mirror 52 is mounted within the housing.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. In a monochromator including a housing defining a radiation entrance slit and a radiation exit slit, means in said housing for collimating radiation from said entrance slit, optical grating means for dispersing said collimated radiation by wavelength, and means for emitting a selected portion of said dispersed radiation from said exit slit, the improvement wherein said radiation emitting means comprises:
   at least one radiation filter;
   means for selectively positioning said filter in the path of radiation leaving said exit slit;
   a rotatable mount supporting said optical grating; and
   means for rotating said mount, said mounting rotating means comprising:
   a camming arm secured to said mount for rotation therewith about an axis and having a cam follower positioned at a predetermined arm length from the axis of rotation of said mount for travel along an arc during rotation of said arm about said axis, said arm length corresponding to the hypotenuse of a right triangle including the angle of rotation of said mount;
   means defining a movable camming surface positioned to advance and retract said cam follower by a distance proportional to the sine of said angle;
   means for so advancing and retracting said camming surface and simultaneously translating it along substantially the entire arc traversed by said cam follower; and
   wherein said means for advancing and retracting comprises: means defining a linear guide and means for selectively positioning said camming surface defining means along said linear guide; said positioning means including a rotatable lead screw extending substantially parallel to said linear guide and means responsive to lead screw rotation to drive said camming surface defining means along said linear guide; said responsive means including a drive nut on said lead screw; gimballing means intermediate and in contact with both said drive nut and camming surface defining means and means for preventing rotation of said drive nut and gimballing means relative to said camming surface defining means.

2. The improvement of claim 1 wherein said gimballing means comprises: an annular washer including a first face defining a first diametrical ridge in contact with said drive nut and a second face defining a second diametrical ridge in contact with said camming surface defining means and substantially perpendicular to said first ridge.

3. The improvement of claim 1 or 2 wherein said rotation preventing means comprises: a pin extending into all of said drive nut, gimballing means, and camming surface defining means, said pin being substantially parallel to the axis of rotation of said lead screw.

4. In a monochromator including a housing defining a radiation entrance slit and a radiation exit slit, means in said housing for collimating radiation from said entrance slit, optical grating means for dispersing said collimated radiation by wavelength, and means for emitting a selected portion of said dispersed radiation from said exit slit, the improvement wherein said radiation emitting means comprises:

at least one radiation filter;
means for selectively positioning said filter in the path of radiation leaving said exit slit;
a rotatable mount supporting said optical grating; and
means for rotating said mount, said mount rotating means comprising:
a camming arm secured to said mount for rotation therewith about an axis and having a cam follower positioned at a predetermined arm length from the axis of rotation of said mount for travel along an arc during rotation of said arm about said axis, said arm length corresponding to the hypotenuse of a right triangle including the angle of rotation of said mount;
means defining a movable camming surface positioned to advance and retract said cam follower by a distance proportional to the sine of said angle;
means for so advancing and retracting said camming surface and simultaneously translating it along substantially the entire arc traversed by said cam follower;
wherein said means for advancing and retracting comprises: means defining a linear guide and means for selectively positioning said camming surface defining means along said linear guide; said positioning means comprises: a rotatable lead screw extending substantially parallel to said linear guide and means responsive to lead screw rotation to drive said camming surface defining means along said linear guide; and
wherein said filter positioning means includes means for alternatively supporting said filter in a first position in said radiation path and in a second position out of said radiation path; and means for actuating said supporting means between said first and second positions in response to movement of said camming surface; said actuating means includes a cam plate reciprocally mounted adjacent said linear guide and substantially parallel thereto and defining a camway therein; cam actuator means carried by said camming surface defining means for travel within said camway; at least one camming shoulder defined by said camway and positioned to be contacted by said cam actuator means to reciprocate said cam plate from a first to a second position; means carried by said lead screw for rotation therewith and positioned to contact said cam plate when moved into said second position and translate it substantially perpendicular to its direction of reciprocation into a third position; and means responsive to translation of said cam plate into said third position for actuating said filter supporting means between its first and second positions.

5. The improvement of claim 4 wherein said responsive means comprises a crankshaft.

6. In a monochromator including a housing defining a radiation entrance slit and a radiation exit slit, means in said housing for collimating radiation from said entrance slit, optical grating means for dispersing said collimated radiation by wavelength, and means for emitting a selected portion of said dispersed radiation from said exit slit, the improvement wherein said radiation emitting means comprises:

at least one radiation filter;
means for selectively positioning said filter in the path of radiation leaving said exit slit;
a rotatable mount supporting said optical grating; and
means for rotating said mount, said mount rotating means comprising:
a camming arm secured to said mount for rotation therewith about an axis and having a cam follower positioned at a predetermined arm length from the axis of rotation of said mount for travel along an arc during rotation of said arm about said axis, said arm length corresponding to the hypotenuse of a right triangle including the angle of rotation of said mount;
means defining a movable camming surface positioned to advance and retract said cam follower by a distance proportional to the sine of said angle;
means for so advancing and retracting said camming surface and simultaneously translating it along substantially the entire arc traversed by said cam follower; and
wherein said means for advancing and retracting comprises: means defining a linear guide and means for selectively positioning said camming surface defining means along said linear guide; said positioning means comprises: a rotatable lead screw extending substantially parallel to said linear guide and means responsive to lead screw rotation to drive said camming surface defining means along said linear guide; said means responsive to lead screw rotation includes a drive nut threadably engaging said lead screw; gimballing means intermediate, and in contact with, both of said drive nut and said camming surface defining means; and means for substantially preventing relative rotation between said camming surface defining means, said gimballing means, and said drive nut.

7. The improvement of claim 6 wherein said gimballing means comprises: an annular washer having a first major surface defining a first raised diametric ridge in contact with said camming surface defining means and a second major surface defining a second diametric ridge in contact with said drive nut, said second ridge being substantially perpendicular to said first ridge.

8. The improvement of claim 7 wherein each major surface of said washer comprises first and second inclined planes intersecting to define a respective ridge.

9. In a monochromator including a housing defining a radiation entrance slit and a radiation exit slit, means in said housing for collimating radiation from said entrance slit, optical grating means for dispersing said collimated radiation by wavelength, and means for emitting a selected portion of said dispersed radiation from said exit slit, the improvement wherein said radiation emitting means comprises:

at least one radiation filter;

means for selectively positioning said filter in the path of radiation leaving said exit slit;

a rotatable mount supporting said optical grating; and means for rotating said mount comprising:

a camming arm secured to said mount for rotation therewith about an axis and having a cam follower positioned at a predetermined arm length from the axis of rotation of said mount for travel along an arc during rotation of said arm about said axis, said arm length corresponding to the hypotenuse of a right triangle including the angle of rotation of said mount;

means defining a movable camming surface positioned to advance and retract said cam follower by a distance proportional to the sine of said angle;

means for so advancing and retracting said camming surface and simultaneously translating it along substantially the entire arc traversed by said cam follower; and wherein said rotatable mount includes a rotatable shaft; a cross bar secured to said shaft; a grating support block including a front surface supporting an optical grating and a back surface; first and second spaced pivot means for pivotally supporting the back surface of said support block against said cross bar on opposite sides of said shaft; means spaced along said shaft from said cross bar for rotatably adjusting said support block about said cross bar on said pivot means; means for tiltingly adjusting said support block along said shaft about an axis substantially mutually perpendicular to said shaft and cross bar; and means resiliently securing said support block to said shaft and cross bar.

10. The improvement of claim 9 wherein said rotation adjusting means comprises a screw.

11. The improvement of claim 9 wherein said tilt adjusting means comprises a screw.

12. The improvement of claim 9 wherein said resilient securing means comprises a spring clip.

* * * * *